US012691770B2

(12) United States Patent
Lee et al.

(10) Patent No.: US 12,691,770 B2
(45) Date of Patent: Jul. 28, 2026

(54) WIRELESS CHARGING APPARATUS AND METHOD THEREOF

(71) Applicant: Research & Business Foundation Sungkyunkwan University, Suwon-si (KR)

(72) Inventors: Byoung-kuk Lee, Suwon-si (KR); Sangjoon Ann, Suwon-si (KR); Won Jin Son, Suwon-si (KR); Man Jae Kwon, Suwon-si (KR); Dong Hyeon Sim, Suwon-si (KR); Ju A Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 690 days.

(21) Appl. No.: 17/846,368

(22) Filed: Jun. 22, 2022

(65) Prior Publication Data

US 2022/0402382 A1 Dec. 22, 2022

(30) Foreign Application Priority Data

Jun. 22, 2021 (KR) ......................... 10-2021-0081141

(51) Int. Cl.
*B60L 53/12* (2019.01)
*B60L 50/90* (2019.01)
*H02J 50/10* (2016.01)
*H02J 50/90* (2016.01)

(52) U.S. Cl.
CPC .............. *B60L 53/12* (2019.02); *H02J 50/10* (2016.02); *H02J 50/90* (2016.02)

(58) Field of Classification Search
CPC ....................................................... H02J 50/90

USPC .......................................................... 320/108
See application file for complete search history.

(56) References Cited

U.S. PATENT DOCUMENTS

| | | | | |
|---|---|---|---|---|
| 2015/0291048 A1* | 10/2015 | Ichikawa | ............... | B60L 53/36 |
| | | | | 701/22 |
| 2016/0052414 A1* | 2/2016 | Bell | ........................ | B60L 53/38 |
| | | | | 320/108 |
| 2016/0052415 A1* | 2/2016 | Bell | ........................ | H02J 50/80 |
| | | | | 320/108 |
| 2017/0203657 A1* | 7/2017 | Ludwig | ................... | H02J 50/12 |
| 2018/0141444 A1* | 5/2018 | Lee | .......................... | B60L 58/10 |
| 2018/0334050 A1* | 11/2018 | Widmer | ............... | B60L 53/126 |
| 2022/0037927 A1 | 2/2022 | Lee et al. | | |

FOREIGN PATENT DOCUMENTS

| | | |
|---|---|---|
| JP | WO2016/072058 A1 | 5/2016 |
| KR | 10-2020-0122678 A | 10/2020 |

OTHER PUBLICATIONS

Korean Office Action issued on Apr. 24, 2023, in counterpart Korean Patent Application No. 10-2021-0081141 (3 pages in Korean).

* cited by examiner

*Primary Examiner* — Ahmed H Omar
(74) *Attorney, Agent, or Firm* — NSIP Law

(57) ABSTRACT

A wireless charging apparatus according to an embodiment of the present disclosure includes a pad determinor configured to determine a receiving pad mounted on an electric vehicle entering a wireless charging station, and a power transmitter configured to select a transmitting pad to correspond to the receiving pad determined by the pad determinor, and transmit charging power to the receiving pad through the transmitting pad.

10 Claims, 12 Drawing Sheets

WIRELESS CHARGING APPARATUS AND METHOD THEREOF

CROSS REFERENCE TO RELATED APPLICATIONS

This application claims the benefit under 35 USC 119(a) of Korean Patent Application No. 10-2021-0081141, filed on Jun. 22, 2021, in the Korean Intellectual Property Office, the entire disclosure of which is incorporated herein by reference for all purposes.

BACKGROUND OF THE DISCLOSURE

Field

The present disclosure relates to a wireless charging apparatus and a method thereof, and more specifically, to a wireless charging apparatus capable of improving charging performance between a receiving pad and a transmitting pad by determining the receiving pad positioned inside an electric vehicle, and using the transmitting pad corresponding to the determined receiving pad, and a method thereof.

Related Art

In general, a wireless charging system for an electric vehicle may be divided into a transmitter circuit and a receiver circuit. The transmitter is configured outside the electric vehicle, and the receiver is mounted inside the electric vehicle to configure the charging system.

The role of the transmitter is to convert a system voltage and transmit it to the receiver through a transmitting pad, and in the case of the receiver, it serves to charge a battery using power received through a receiving pad.

The shape of the transmitting pad and the receiving pad has four shapes, respectively, CP, DDP, DDQP, and BPP. Therefore, a total of 16 combinations of the receiving pad and the transmitting pad are possible. Since magnetic characteristics are different depending on the shape of each pad and the direction of the current flowing through the pad, a difference in coupling performance occurs for each combination of the receiving pad and the transmitting pad. If the coupling performance is not good, the efficiency of the charging system is reduced, or in severe cases, the coupling between the pads is not performed, so that there is a problem that power transmission is impossible.

SUMMARY

The present disclosure has been devised to solve the above problems, since the shape of a receiving pad used depending on the electric vehicle manufacturer or the type of electric vehicle may vary, and in order to increase the coupling performance between the pads, and an object of the present disclosure is to provide a wireless charging apparatus capable of improving charging performance between the receiving pad and a transmitting pad by determining the shape of the receiving pad, and using the transmitting pad corresponding to the determined shape of the receiving pad, and a method thereof.

The technical objects to be achieved in the present disclosure are not limited to the above-mentioned matters, and other technical problems not mentioned may be considered by those of ordinary skill in the art to which the present disclosure pertains from the embodiments of the present disclosure to be described below.

Hereinafter, a wireless charging apparatus and a method thereof will be described as embodiments of the present disclosure.

A wireless charging apparatus according to an embodiment of the present disclosure comprises a pad determinor configured to determine a receiving pad mounted on an electric vehicle entering a wireless charging station; and a wireless charger configured to select a transmitting pad to correspond to the receiving pad determined by the pad determinor, and transmit charging power to the receiving pad through the transmitting pad.

In addition, the pad determinor may include a searching coil and a controller configured to determine the receiving pad through a change in inductance of the searching coil due to a difference in magnetic coupling characteristics between the searching coil and the receiving pad.

In addition, the searching coil may be positioned between the receiving pad and the transmitting pad.

In addition, the wireless charger may not transmit power to the receiving pad through the searching coil.

In addition, the searching coil may be formed to be larger than the receiving pad.

In addition, the searching coil may be formed to have the same size as the transmitting pad.

A wireless charging method according to an embodiment of the present disclosure comprises detecting a receiving pad mounted on the electric vehicle entering the wireless charging station; determining the detected receiving pad; selecting a transmitting pad to correspond to the determined receiving pad; and transmitting charging power to the receiving pad through the transmitting pad.

In addition, the determining may be performed to determine the receiving pad through a change in inductance of a searching coil due to a difference in magnetic coupling characteristics between the searching coil disposed in the wireless charging apparatus and the receiving pad.

The above-described aspects of the present disclosure are only some of the preferred embodiments of the present disclosure, and various embodiments in which the technical features of the present disclosure are reflected may be derived and understood by those of ordinary skill in the art based on the detailed description of the present disclosure to be described below.

According to the embodiments of the present disclosure, the following effects can be obtained.

The wireless charging apparatus and the method thereof according to an embodiment of the present disclosure may improve charging performance therebetween by charging it by determining the shape of the receiving pad mounted on the electric vehicle entering the wireless charging station, and using the transmitting pad corresponding to the determined shape of the receiving pad.

The effects obtainable in the embodiments of the present disclosure are not limited to the above-mentioned effects, and other effects not mentioned can be clearly derived and understood by those of ordinary skill in the art to which the present disclosure pertains from the description of the embodiments of the present disclosure below. That is, unintended effects of implementing the present disclosure may also be derived by those of ordinary skill in the art from the embodiments of the present disclosure.

BRIEF DESCRIPTION OF THE DRAWINGS

The accompanying drawings, which are included as a part of the description to help understanding the present disclosure, provide various embodiments of the present disclosure.

In addition, the accompanying drawings are used to describe embodiments of the present disclosure with the description.

FIGS. 3 and 4 are diagrams for describing a receiving pad and a transmitting pad according to an embodiment of the present disclosure.

DETAILED DESCRIPTION

Figure 1:
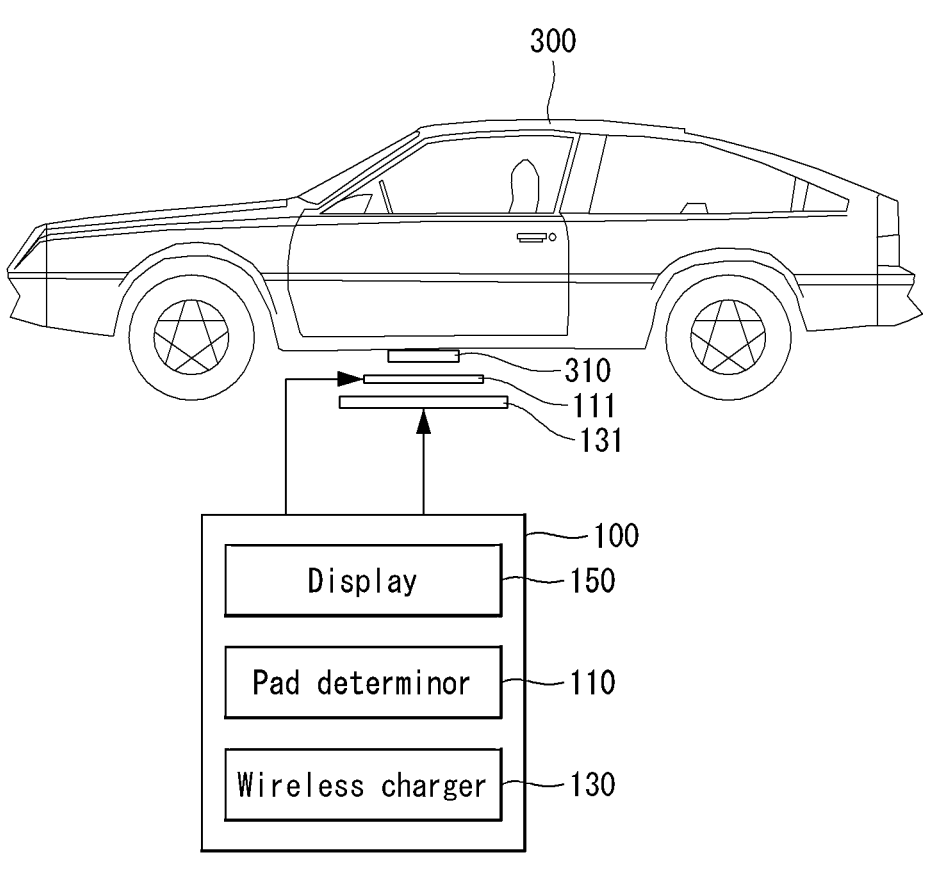
FIGS. 1 and 2 are diagrams for describing a wireless charging apparatus according to an embodiment of the present disclosure.

Hereinafter, a wireless charging apparatus and a method thereof will be described as embodiments of the present disclosure.

The following embodiments combine elements and features of the present disclosure in a predetermined form. Each element or feature may be considered optional unless explicitly stated otherwise. Each element or feature may be implemented in a form that is not combined with other elements or features. In addition, some elements and/or features may be combined to constitute an embodiment of the present disclosure. The order of operations described in the embodiments of the present disclosure may be changed. Some configurations or features of one embodiment may be included in another embodiment, or may be replaced with corresponding configurations or features of another embodiment.

In the description of the drawings, parts, devices, and/or configurations that may obscure the gist of the present disclosure are not described, and parts, devices, and/or configurations that could be understood at the level of those skilled in the art are also not described. In addition, in the drawings, parts referred to using the same reference numerals mean the same elements or steps in a device configuration or method.

Throughout the specification, when a part is said to "comprising or including" a certain element, this means that other elements may be further included without excluding other elements unless otherwise stated. In addition, terms such as "~ unit" or "~ group" described in the specification mean a unit for processing at least one function or operation. Also, the terms "a or an", "one", "the" and similar related terms may be used in a sense including both the singular and the plural in the context of describing the present disclosure (especially, in the context of the following claims) unless otherwise indicated in the present disclosure or otherwise clearly contradicted by context.

In addition, specific terms and/or symbols used in the embodiments of the present invention are provided to help the understanding of the present invention, and the use of these specific terms may be changed to other forms without departing from the technical spirit of the present disclosure.

Figure 2:
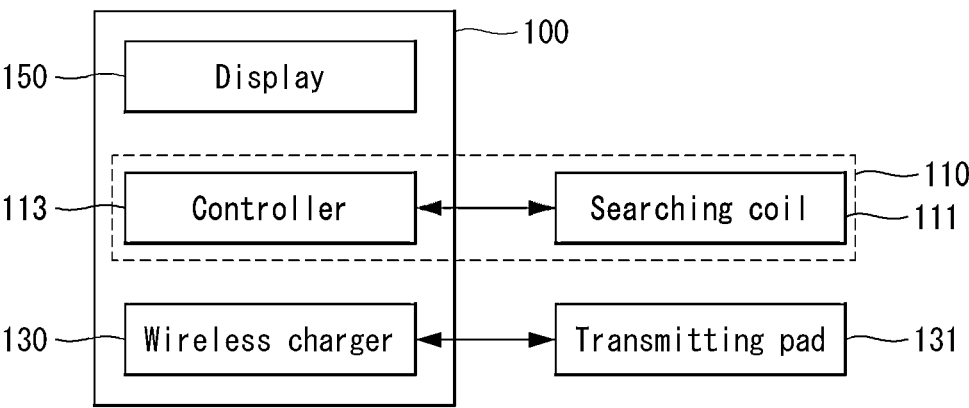
Figure 3:
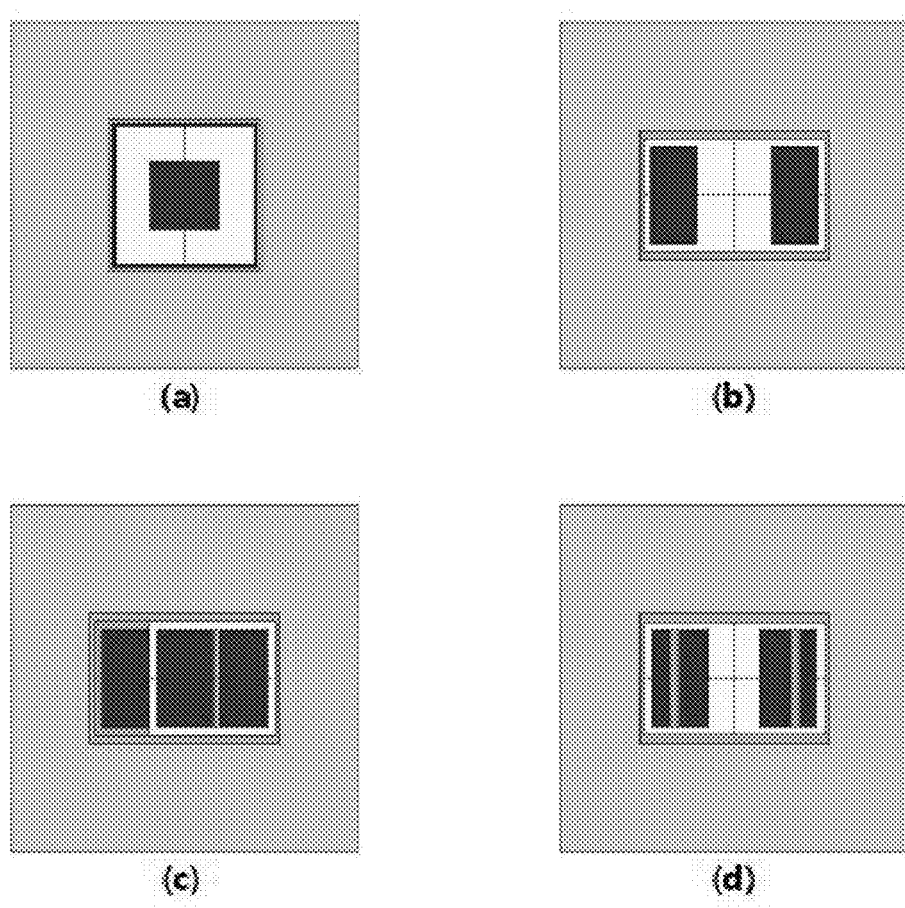
Figure 4:
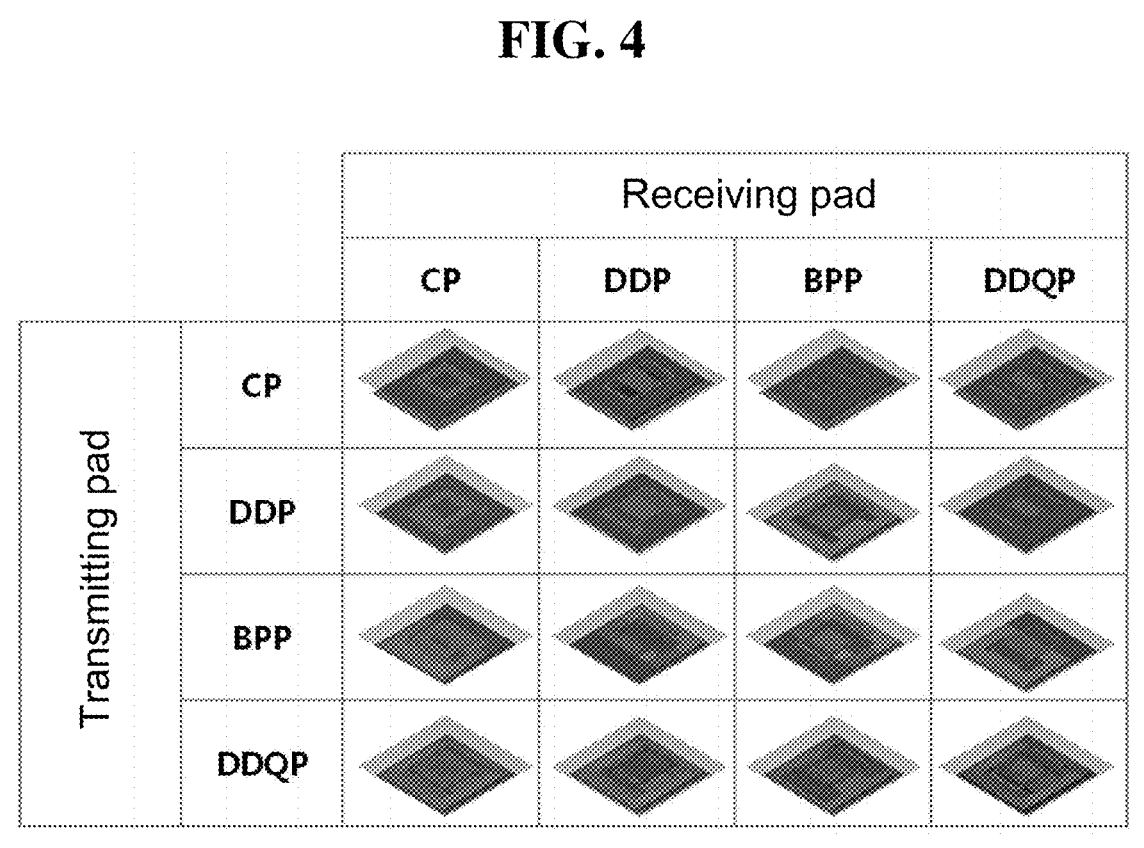
Figure 5:
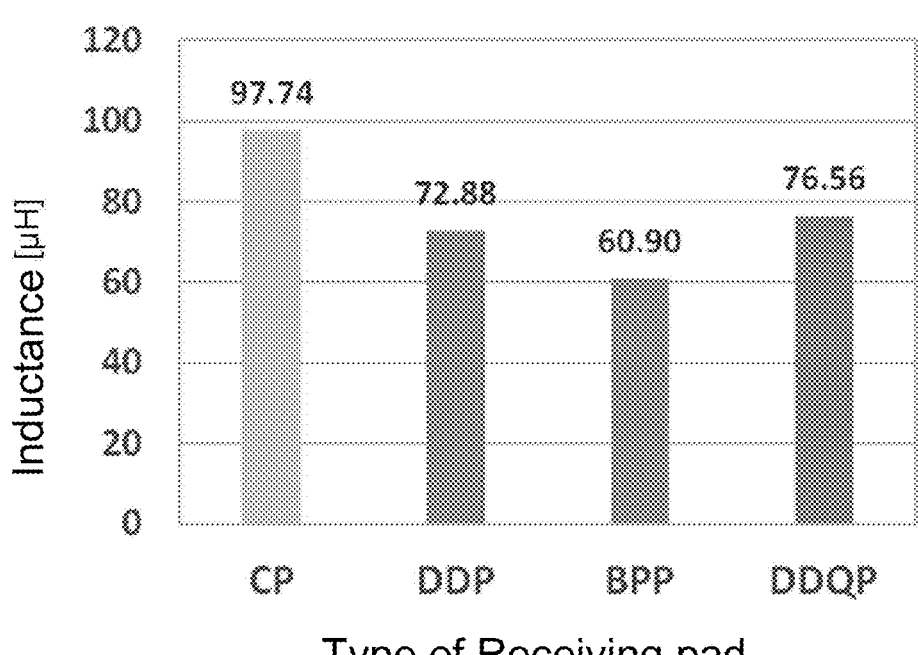
FIG. 5 is a diagram for describing inductance of a searching coil that is changed according to various receiving pads according to an embodiment of the present disclosure.

FIGS. 1 and 2 are diagrams for describing a wireless charging apparatus according to an embodiment of the present disclosure. FIGS. 3 and 4 are diagrams for describing a receiving pad and a transmitting pad according to an embodiment of the present disclosure. FIG. 5 is a diagram for describing inductance of a searching coil that is changed according to various receiving pads according to an embodiment of the present disclosure.

Referring to FIGS. 1 to 5, a wireless charging apparatus 100 according to an embodiment of the present disclosure may include a pad determinor 110 and a wireless charger 130.

When an electric vehicle 300 enters a wireless charging station, the wireless charging apparatus 100 may sense it and provide a sensing signal to the pad determinor 110.

The pad determinor 110 may determine a receiving pad 310 loaded or mounted on the electric vehicle 300 entering the wireless charging station. That is, when receiving the sensing signal, the pad determinor 110 may operate to determine the receiving pad 310 loaded or mounted on the electric vehicle 300. The electric vehicle 300 may include at least one receiving pad 310. As shown in (a), (b), (c), and (d) in FIG. 3, the receiving pad 310 may include at least one type. The receiving pad 310 may include a receiving coil (VA coil). For example, the receiving pad 310 may include four shapes as CP (FIG. 3 (a)), DDP (FIG. 3 (b)), BPP (FIG. 3 (c)), DDQP (FIG. 3 (d)) according to the design of the receiving coil. The receiving pad 310 has a different direction of current flowing through each of the CP, DDP, BPP, and DDQP, and different magnetic characteristics depending on the direction of the current. Accordingly, the receiving pad 310 may have a difference in coupling performance depending on types of a transmitting pad 131 to be described later. A detailed description of the pad determinor 110 will be described later.

The wireless charger 130 may select the transmitting pad 131 to correspond to the receiving pad 310 determined from the pad determinor 110. The wireless charger 130 may transmit power to the receiving pad 310 through the selected transmitting pad 131.

The wireless charger 130 may include at least one transmitting pad 131. As shown in FIG. 4, the transmitting pad 131 may include at least one type. The transmitting pad 131 may include a transmitting coil (GA coil). For example, as the above-described receiving pad 310, the transmitting pad 131 may include four shapes as CP, DDP, BPP, and DDQP according to the design of the transmitting coil. The transmitting pad 131 has a different direction of current flowing through each of the CP, DDP, BPP, and DDQP, and different magnetic characteristics depending on the direction of the current. Accordingly, the transmitting pad 131 may have a difference in coupling performance depending on types of the receiving pad 310.

As shown in FIG. 4, the transmitting pad 131 and the receiving pad 310 may have four shapes as CP, DDP, BPP, and DDQP, respectively. Therefore, a total of 16 combinations of the receiving pad 310 and the transmitting pad 131 are possible. Since the magnetic characteristics are different depending on the shape of each pad and the direction of the current flowing through the pad, a difference in coupling performance may occur for each combination of the receiving pad 310 and the transmitting pad 131. If the coupling performance is poor, the efficiency of the charging system may decrease, or in severe cases, power transmission may not be possible because coupling between the pads is not performed.

A display 150 may be disposed on the wireless charging apparatus 100, and may display a charging process in the receiving pad 310 using the transmitting pad 131 in real time.

The wireless charging apparatus 100 according to an embodiment of the present disclosure may improve charging performance therebetween by charging it by determining the shape of the receiving pad 310 mounted on the electric vehicle 300 entering the wireless charging station, and using the transmitting pad 131 corresponding to the shape of the determined receiving pad 310.

The pad determinor 110 may include a searching coil 111 and a controller 113.

The searching coil 111 may be positioned between the receiving pad 310 and the transmitting pad 131. The searching coil 111 may be defined as a coil that determines the shape or type of the receiving pad 310 by using a difference in magnetic characteristics according to the shape of the receiving coil (VA coil). The searching coil 111 may determine the shape of the receiving pad 310 by using magnetic characteristics between the receiving coils (VA coils) disposed on the receiving pad 310. The present disclosure may design the shape of the searching coil 111 to minimize a change in magnetic characteristics due to an alignment error between the searching coil 111 and the receiving coil (VA coil).

The searching coil 111 may increase the size of Lsearching according to the number of turns. Therefore, as N (N is a natural number greater than or equal to 1) of the searching coil 111 is larger, the difference in Lsearching according to the receiving coil (VA coil) is large, so that the shape of the receiving coil (VA coil) can be easily determined. That is, as the number of turns N of the searching coil 111 increases, the shape of the receiving pad 310 may be more accurately determined.

Here, the searching coil 111 should be configured to be as light as possible and not occupy a volume, so it is desirable to design N as small as possible. Accordingly, the searching coil 111 may have the number of 9 to 11 turns having a relatively small value of N while clearly showing a difference in Lsearching. That is, since the searching coil 111 does not play a main power transmission role, it is preferable to be configured to be light and not occupy a volume. Accordingly, the searching coil 111 may be composed of an inductor having a thinner and simpler configuration than the transmitting/receiving pad 310, thereby reducing the volume and weight occupied by the inductor.

The controller 113 may determine the receiving pad 310 through change in inductance of the searching coil 111 due to a difference in magnetic coupling characteristics between the search coil 111 and the receiving pad 310. The controller 113 may include a current sensor or a metal detector circuit, etc. This will be described later. The controller 113 may be configured to determine electrical parameters for each shape of the receiving pad 310 using the current sensor or the metal detector circuit, etc.

The controller 113 may determine the receiving pad 310 by using different magnetic property depending on the shape of the receiving pad 310, and different coupling characteristics with the searching coil 111 for each shape of the receiving pad 310. As shown in FIG. 5, when a voltage of the same magnitude is applied to the search coil 111, the controller 113 may sense a current flowing through the searching coil 111, and through this, detect a change in inductance of the searching coil 111 to determine the receiving pad 310.

The controller 113 may determine the shape or type of the receiving pad 310 by sensing that the inductance of the searching coil 111 varies depending on the type of the receiving pad 310 having a receiving coil having a different shape even when the same voltage is applied to the searching coil 111.

Figure 6:
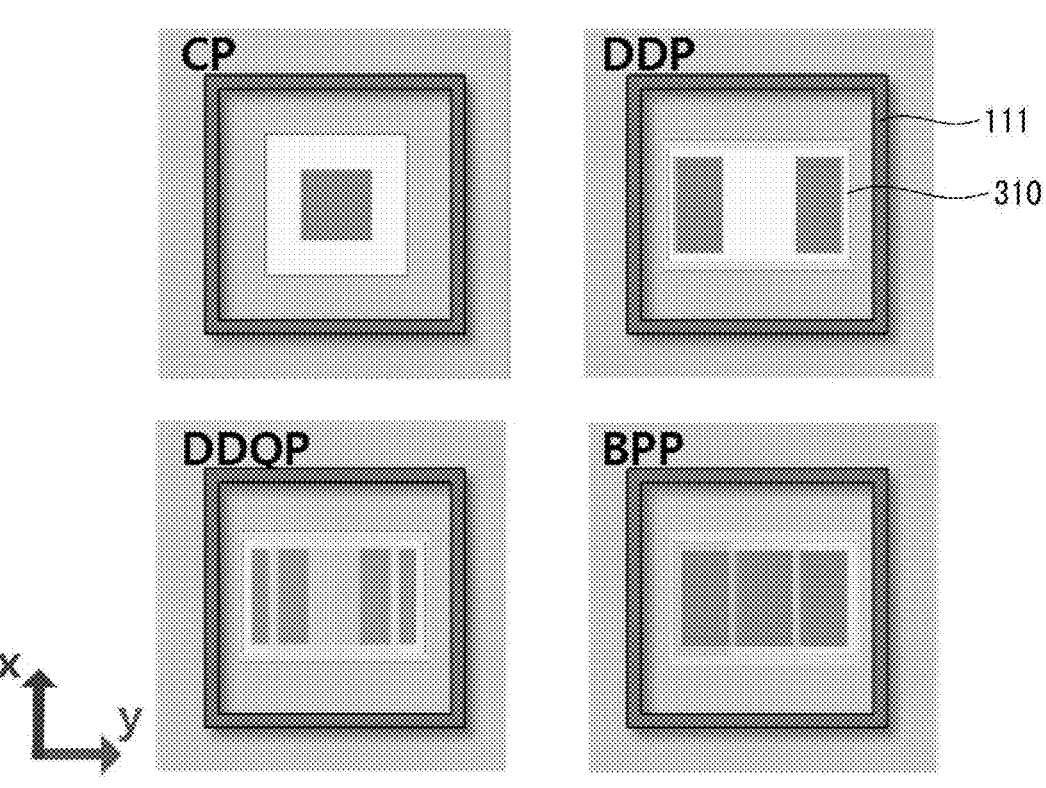
FIG. 6 is a diagram for describing a size of a searching coil, a receiving pad, and a transmitting pad according to an embodiment of the present disclosure.
Figure 7:
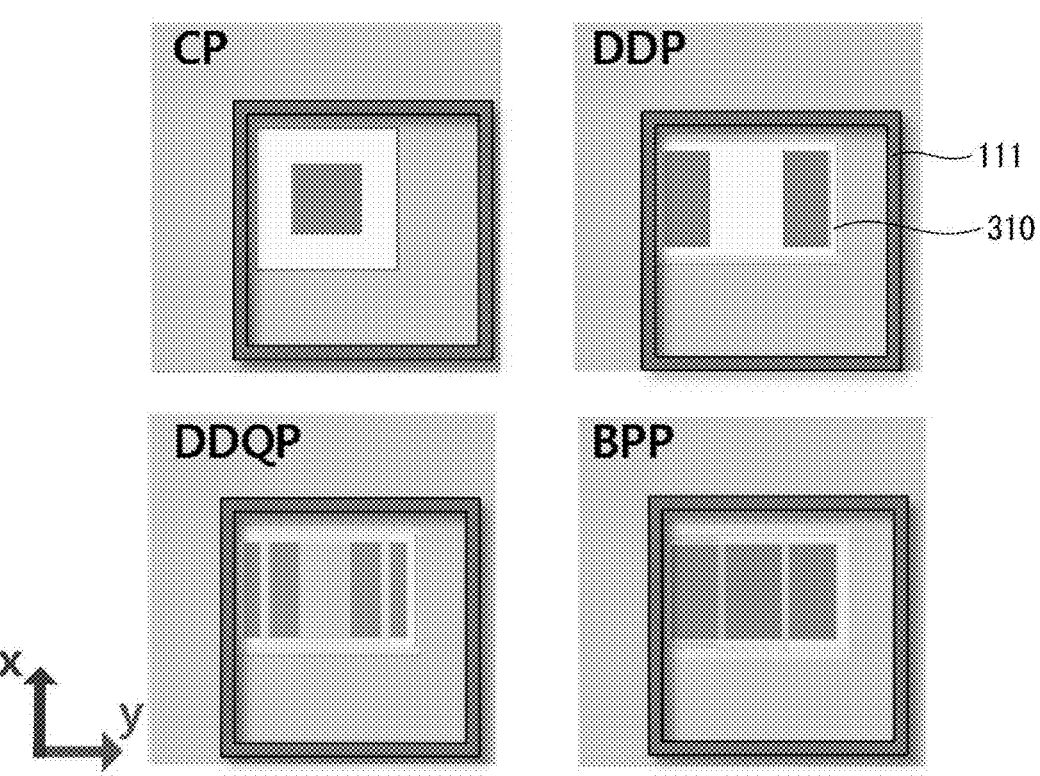
FIG. 7 is a diagram for describing an alignment error between a searching coil and a receiving pad according to an embodiment of the present disclosure.
Figure 8:
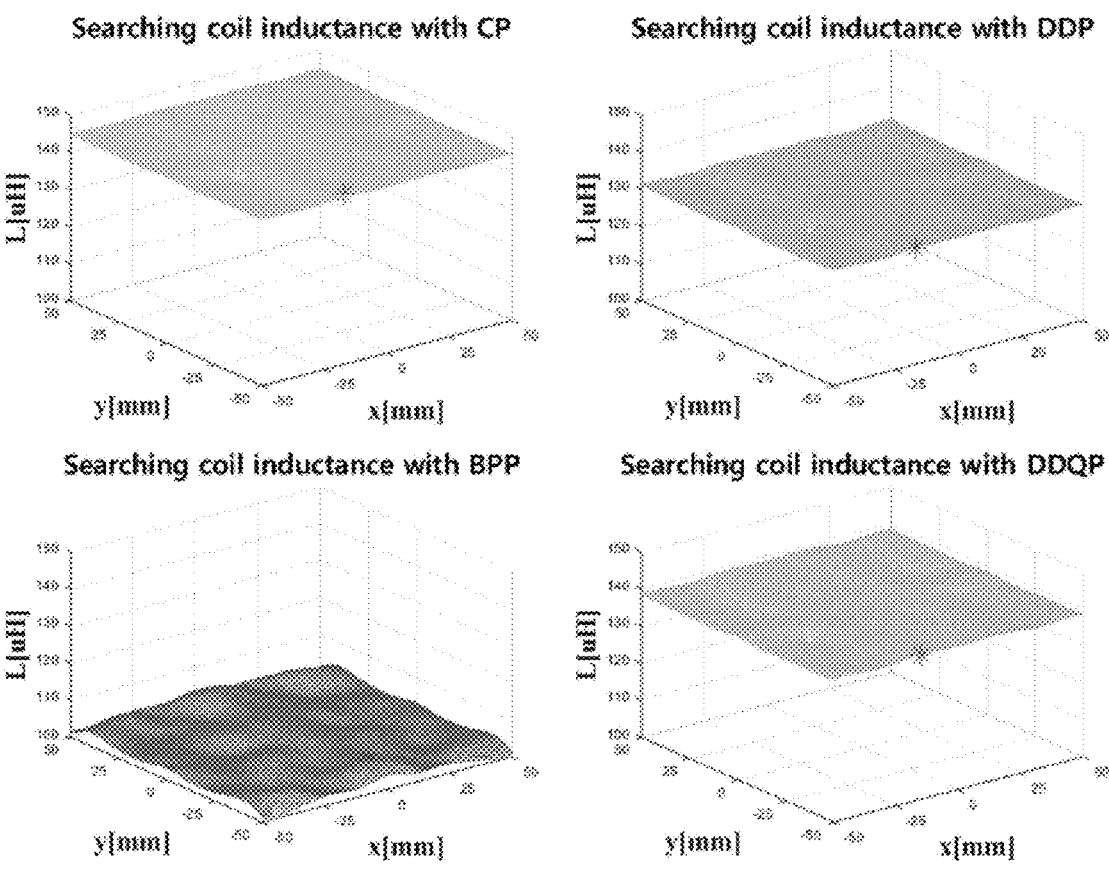
FIG. 8 is a diagram for describing a change in inductance of a searching coil according to a separation distance between the searching coil and a receiving pad according to an embodiment of the present disclosure.

FIG. 6 is a diagram for describing a size of a searching coil, a receiving pad, and a transmitting pad according to an embodiment of the present disclosure, FIG. 7 is a diagram for describing an alignment error between a searching coil and a receiving pad according to an embodiment of the present disclosure, and FIG. 8 is a diagram for describing a change in inductance of a searching coil according to a separation distance between the searching coil and a receiving pad according to an embodiment of the present disclosure.

Referring to FIGS. 6 to 8, the searching coil 111 according to an embodiment of the present disclosure may be formed to be larger than the receiving pad 310. The searching coil 111 may be formed to have a size larger than that of various types of receiving pads 310. Since the searching coil 111 has a larger size than that of the coil of the receiving pad 310, coupling characteristics with the receiving pad 310 may not change significantly even if the searching coil 111 is not located in the exact center of the receiving pad 310. The searching coil 111 may reduce an alignment error with the receiving pad 310 even if the searching coil 111 is not accurately aligned with the receiving pad 310.

As shown in FIG. 8, it can be seen that the change in inductance of the searching coil 111 is not large even if there is a separation distance between the searching coil 111 and the receiving pad. That is, it can be seen that the electrical parameter change according to the alignment error is not large even if the position of the searching coil 111 is not precisely aligned. Accordingly, since the inductance of the searching coil 111 changes only depending on the type of the receiving pad 310, the controller 113 may easily determine the type of the receiving pad 310 using the change in inductance of the searching coil 111.

In addition, the transmitting pad 131 is the wireless charging apparatus 100 including that which is formed in the same size as the searching coil 111.

Figure 9:
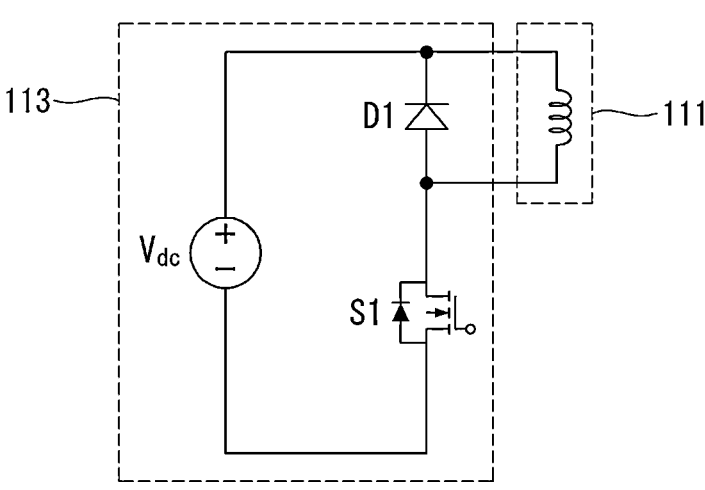
FIG. 9 is a diagram for describing a circuit provided in a controller according to an embodiment of the present disclosure.
Figure 10:
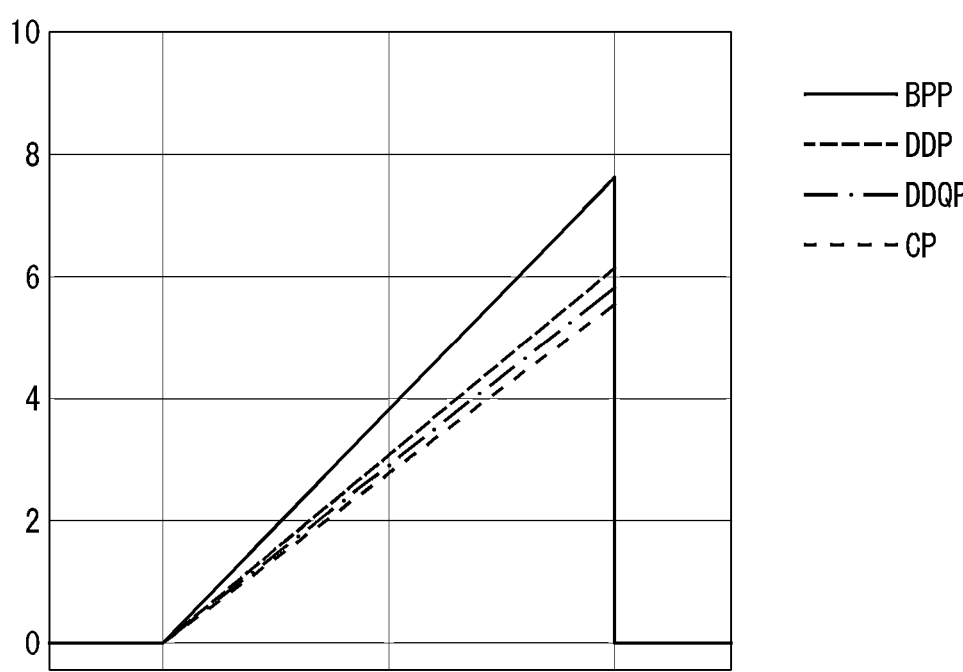
FIG. 10 is a diagram for describing a signal measured through FIG. 9.

FIG. 9 is a diagram for describing a circuit provided in a controller according to an embodiment of the present disclosure, and FIG. 10 is a diagram for describing a signal measured through FIG. 9.

The present disclosure may confirm the shape of the receiving pad 310 by determining the change in inductance of the searching coil 111 due to the difference in the coupling characteristics of the searching coil 111 and the wireless charging pad.

The controller 113 is electrically connected to the searching coil 111, and may measure the inductance of the searching coil 111. The controller 113 may include a power supply part Vdc capable of providing a predetermined voltage to the searching coil 111 by converting external power, a switching part Si turned on to provide the predetermined voltage to the searching coil 111 when a sensing signal is provided, and a protection part D1 protecting the searching coil 111 by preventing reverse current. The present disclosure is not limited thereto, and the controller 113 may provide or block the predetermined voltage to the searching coil 111 by joining or combining various components.

For example, as shown in FIG. 9, when a pulse voltage is applied to the searching coil 111 after configuring the controller 113, a current having a waveform as shown in FIG. 10 flows through the searching coil 111. Since the inductance of the searching coil 111 is different for each pad type, a difference in the maximum current value occurs when a pulse of the same width is applied. Therefore, it is possible to determine the type of the receiving pad through the difference in the maximum current value.

For example, BPP may have the highest current value among the receiving pads 310, and CP may have the lowest current value among the receiving pads 310. In addition, DDP may be lower than the current value of BPP and higher than the current value of CP among the receiving pads 310, and DDQP may be lower than the current value of DDP and higher than the current value of CP among the receiving pads 310.

Figure 11:
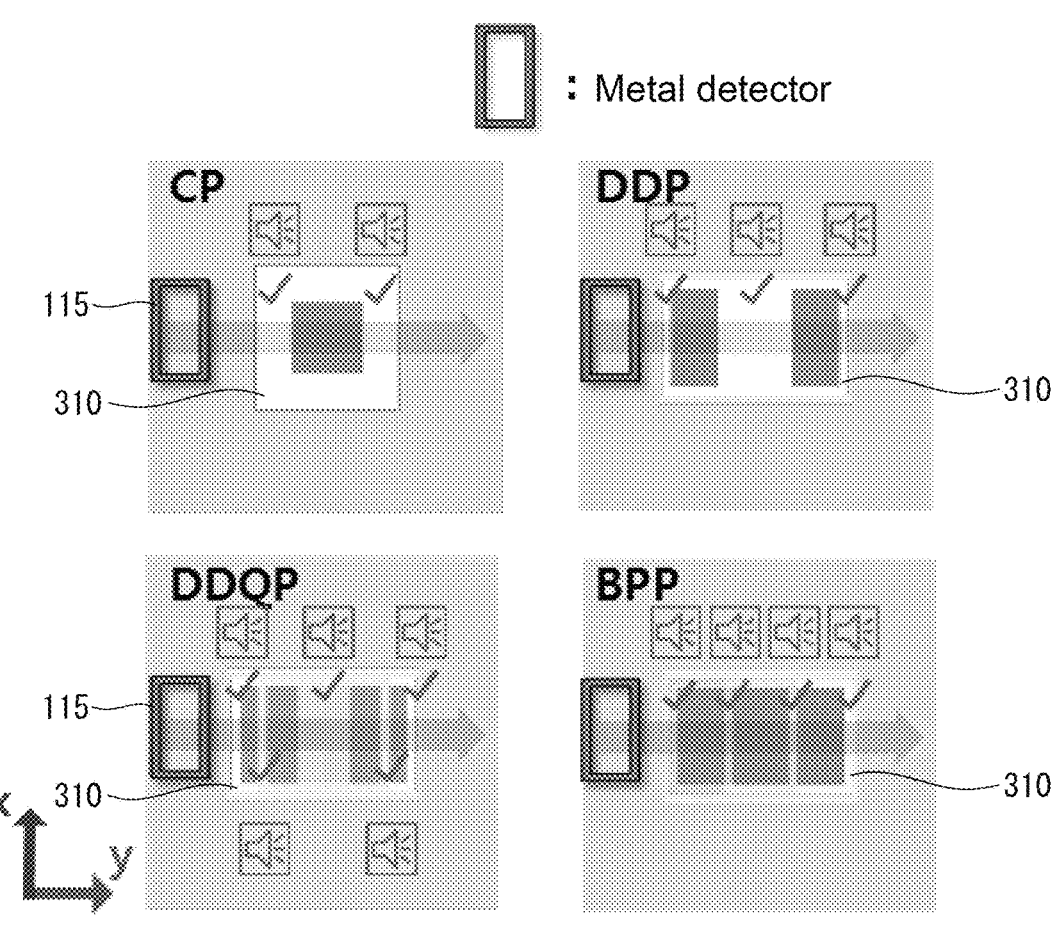
FIG. 11 is a diagram for describing a metal detector provided in a controller according to another embodiment of the present disclosure.

FIG. 11 is a diagram for describing a metal detector provided in a controller according to another embodiment of the present disclosure.

Referring to FIG. 11, a controller 113 according to another embodiment of the present disclosure may include a metal detector 115.

The controller 113 may determine the shape of the receiving pad 310 using the metal detector 115. The controller 113 may sense the number of times the coil of the receiving pad 310 meets the search coil 111 while moving the searching coil 111 in the Y direction, which is a direction in which the electric vehicle 300 proceeds.

For example, as shown in FIG. 11 (a), when the number of times the coil of the receiving pad 310 and the searching coil 111 meet each other is 2, the controller 113 may determine CP among a plurality of the receiving pad 310, as shown in FIG. 11 (b), when the number of times the coil of the receiving pad 310 and the searching coil 111 meet each other is 3, the controller 113 may determine DDP among the plurality of receiving pad 310, as shown in FIG. 11 (c), when the number of times the coil of the receiving pad 310 and the searching coil 111 meet each other is 5, the controller 113 may determine DDQP among the plurality of receiving pads 310, and as shown in FIG. 11 (d), when the number of times the coil of the receiving pad 310 and the searching coil 111 meet each other is 4, the controller 113 may determine BPP among the plurality of receiving pads 310.

As described above, in the present disclosure, since the shape is different for each receiving pad 310, when moving the searching coil 111 in the y-axis, the number of times the coil of the receiving pad 310 and the searching coil 111 meet may be different. Therefore, the controller 113 may determine the shape of the receiving pad through the number of detections of the metal detector 115.

Figure 12:
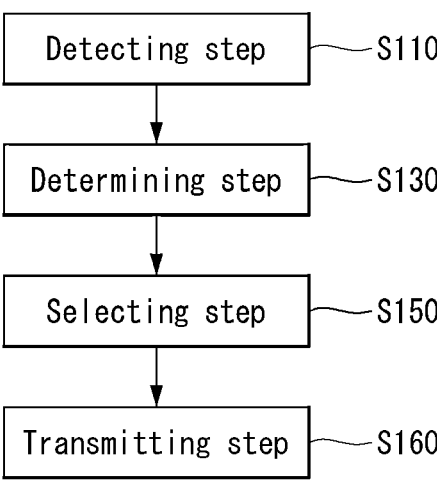
FIG. 12 is a diagram for describing a method of wireless charging an electric vehicle entering a wireless charging station using a wireless charging apparatus according to an embodiment of the present disclosure.

FIG. 12 is a diagram for describing a method of wireless charging an electric vehicle entering a wireless charging station using a wireless charging apparatus according to an embodiment of the present disclosure.

Referring to FIG. 12, a wireless charging method according to an embodiment of the present disclosure may include detecting step S110, determining step S130, selecting step S150, and transmitting step S160.

The detecting step S110 may be performed to detect a receiving pad 310 mounted on the electric vehicle 300 entering the wireless charging station. When the electric vehicle 300 enters the wireless charging station, a wireless charging apparatus 100 may generate a detecting signal or a sensing signal, and provide it to a controller 113. The controller 113 may provide a predetermined voltage to a searching coil 111 when the detecting signal or the sensing signal is provided.

The determining step S130 may be performed to determine the detected receiving pad 310. The wireless charging apparatus 100 may apply a pulse voltage to the searching coil 111 and sense a current flowing through the searching coil 111. That is, when a pulse of the same width is applied to the searching coil 111, the wireless charging apparatus 100 may measure or sense the different inductance of the searching coil 111 for each type of the receiving pad 310. The wireless charging apparatus 100 may easily determine the type of the receiving pad through the difference in the different inductances of the searching coil 111 or the maximum current values of the searching coil 111.

In addition, the wireless charging apparatus 100 may determine the receiving pad 310 using a metal detector. For example, the wireless charging apparatus 100 may sense the number of times the coil of the receiving pad 310 and the searching coil 111 meet for each receiving pad 310 when the search coil 111 is moved in the direction in which the electric vehicle 300 proceeds. That is, the wireless charging apparatus 100 may determine the shape of the receiving pad through the number of detections of the metal detector.

The selecting step S150 may be performed to select a transmitting pad 131 to correspond to the determined receiving pad 310. For example, the wireless charging apparatus 100 may select one of a plurality of transmitting pads 131 according to the determined receiving pad 310.

The transmitting step S160 may be performed to transmit charging power to the receiving pad 310 through the transmitting pad 131. The transmitting step S160 may be referred to as a charging step. The wireless charging apparatus 100 may transmit charging power only through the transmitting pad 131 without transmitting power to the receiving pad 310 through the searching coil 111.

As described above, the present disclosure can easily grasp or determine the shape of the receiving pad 310 by using the searching coil 111. The present disclosure can select the shape of the transmitting pad 131 capable of improving coupling performance with the receiving pad 310 by determining the shape of the receiving pad 310, and improve the coupling performance between the transmitting and receiving pads 131 and 310 in the pad determinor 110 such as controlling the current direction of the transmitting pad 131. This may have the advantage of increasing the efficiency of the wireless charging apparatus 100.

The above-described embodiments of the present disclosure may be embodied in other specific forms without departing from the essential characteristics of the present disclosure. Accordingly, the above-described description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. In addition, claims that are not explicitly cited in the claims may be combined to form an embodiment, or may be included as new claims by amendment after filing.

What is claimed is:
1. A wireless charging apparatus, comprising:
   a pad determinor configured to determine a shape of a receiving pad mounted on an electric vehicle entering a wireless charging station; and a wireless charger configured to physically select from among a plurality of distinct transmitting pads, each having a fixed physical shape that corresponds to the shape of the receiving pad determined by the pad determinor, and transmit charging power to the receiving pad through the transmitting pad, wherein the pad determinor comprises a single searching coil positioned between the receiving pad and the transmitting pad, and a controller configured to apply a pulse voltage to the single searching coil and determine the shape of the receiving pad from a difference in a maximum current value observed for the pulse among pad types.

2. The apparatus of claim 1, wherein the plurality of transmitting pads includes pad shapes among CP, DDP, BPP, and DDQP, and the wireless charger selects a transmitting pad whose fixed coil shape corresponds to the shape determined for the receiving pad.

3. The apparatus of claim 1, wherein the single searching coil has a lateral extent greater than a lateral extent of the receiving pad and substantially equal to a lateral extent of a transmitting pad.

4. The apparatus of claim 2, wherein the controller is configured to sense a current waveform produced in response to the pulse voltage applied to the single searching coil and determine the shape of the receiving pad from a difference in a maximum current value measured from the measured current waveform.

5. The apparatus of claim 1, wherein the controller compares the measured maximum current to predetermined thresholds associated with CP, DDP, BPP, and DDQP.

6. The apparatus of claim 1, further comprising a selector controlled by the controller to position or choose the selected transmitting pad.

7. A method of wireless charging an electric vehicle entering a wireless charging station using a wireless charging apparatus, comprising:

detecting a receiving pad mounted on the electric vehicle entering the wireless charging station;

determining a shape of the detected receiving pad by applying a pulse voltage to a single searching coil positioned between a transmitting pad and the receiving pad, sensing a current in the single searching coil, and determining the shape from a difference in a maximum current value observed for the pulse among pad types;

physically selecting from among a plurality of distinct transmitting pads, each having a fixed physical coil shape that corresponds to the shape of the determined receiving pad; and transmitting charging power to the receiving pad through the transmitting pad.

8. The method of claim 7, further comprising comparing the observed maximum current value to predetermined thresholds associated with CP, DDP, BPP and DDQP pad types.

9. The method of claim 7, further comprising presenting, on a user interface, an indication of the selected transmitting pad during charging.

10. A wireless charging apparatus for charging an electric vehicle, comprising:

a pad determinor configured to determine a shape of a receiving pad mounted on the electric vehicle, the pad determinor including a single searching coil positioned between a transmitting pad and the receiving pad and a controller electrically connected to the single searching coil, wherein the controller is configured to apply a pulse voltage to the single searching coil, sense a current flowing through the single searching coil in response to the pulse, and determine the shape of the receiving pad from a difference in a maximum current value observed for a pulse of the same width among pad types, and wherein the single searching coil is formed to be larger than the receiving pad and is formed to have substantially a same size as a transmitting pad; and a wireless charger including a plurality of distinct transmitting pads, each having a fixed physical coil shape, the wireless charger being configured to physically select a transmitting pad whose fixed coil shape corresponds to the shape determined for the receiving pad and to transmit charging power to the receiving pad through the selected transmitting pad.

* * * * *